April 14, 1959   A. W. VINGERHOETS   2,882,413
LUMINESCENT SCREEN
Filed Dec. 3, 1954

United States Patent Office 2,882,413
Patented Apr. 14, 1959

2,882,413

LUMINESCENT SCREEN

Antonius Wilhelmus Vingerhoets, Haarlem, Netherlands

Application December 3, 1954, Serial No. 472,881

Claims priority, application Germany December 4, 1953

13 Claims. (Cl. 250—80)

The invention relates to a luminescent screen for converting X-rays, cathode rays and the like into light rays. The rays to be converted into light rays will be indicated by the expression "exciting rays" hereinafter.

In general, a luminescent screen consists of a carrier on which a layer of finely divided luminescent crystals has been deposited. In cathode ray tubes, the carrier may be a part of the tube envelope; in viewing and amplifying screens for X-ray purposes, the carrier is a separate structure. The light rays emanating from one of the two principal surfaces of the screen, indicated as the "observation surface" hereinafter, are utilized either for direct viewing, for instance in cathode ray tubes or in X-ray transillumination, or for photographic purposes, for instance in X-ray photography. The luminescent layer may be either on the side of the carrier facing the source of exciting rays, or on the side of the carrier remote from said source; in the latter case, the carrier must be pervious to the exciting rays. Although, if the carrier is light pervious, the observation surface may be, in principle, on either side of the screen, the invention is especially applicable to luminescent screens in which the observation surface is on that side of the screen, on which the luminescent layer is deposited.

In the known luminescent screens, the crystals in the luminescent layer are disposed at random, so that the light rays generated by the crystals are scattered to all directions. As a consequence, only a small fraction of the total light flux generated by the crystals emanates from the observation surface, and the conversion efficiency of the screen is very low. Furthermore, a beam of exciting rays impinging on the screen and having a certain cross sectional area will cause a larger area of the observation surface to be illuminated, i.e. the image on the screen will be blurred.

In order to avoid these disadvantages, it has been proposed to embed the luminescent crystals in a binding material having the same refractive index as the crystals, to cut rods out of the binding material containing these crystals, and to arrange these rods with their axial direction at right angles with the observation surface. It was expected that the effect would be the same as if the luminescent layer consisted of large crystals, and that, due to total reflection in these large crystals, all light generated by the exciting rays would emanate from the end surfaces of the rods. In practice, however, the effect was not quite satisfactory, as a considerable scattering of the light rays was still found to occur. Moreover, if the screen is hit by X-rays, secondary X-rays are generated in the luminescent crystals and in the binding material, and these secondary rays are not reflected by the walls of the rods, and cause light rays to be generated in adjacent rods, so that the image is still blurred.

It has also been suggested to reduce the diffuse light radiation by embedding the luminescent crystals in a colored binding material. Although this method leads to sharper images, it has been found that the colored binding material does not only reduce the undesired radiation in a direction substantially in parallel with the observation surface, but that the desired radiation is also attenuated. In fact it was found that the same, or even a better conversion efficiency could be obtained by using a very thin uncolored screen.

Furthermore, it has been proposed to provide X-ray screens, in particular amplifying screens, with a crossed grid or honeycomb structure made of light reflecting metal foils, the apertures of this grid structure being filled with the luminescent material; it was expected that this construction would reduce the scattering of both the light rays and the secondary X-rays. In practice however, although the secondary X-rays were partially absorbed, in the same way as with the usual Bucky type screens, the scattering of the light rays was not materially reduced, since the light rays reflected by the metal foils were substantially in parallel with the observation surface.

It is an object of the invention to provide a luminescent screen for converting X-rays, cathode rays and the like into light rays, which has a high conversion efficiency.

Another object of the invention is to provide a luminescent screen of the above-mentioned kind, wherein the scattering of the light rays is greatly reduced, so that relatively sharp images are obtained.

A further object of the invention is to deflect the light rays generated in a luminescent screen and being substantially in parallel with the observation surface of said screen in such manner that these light rays emanate from the observation surface.

Other objects of the invention will appear from the description of some preferred embodiments thereof, given with reference to the accompanying drawing in which.

Figure 1:
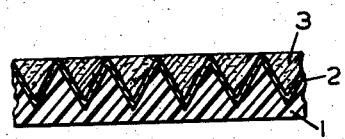
Fig. 1 is a cross section of a luminescent screen.
Figure 2:
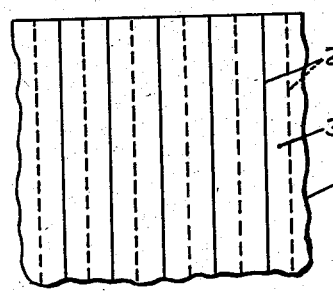
Fig. 2 is a plan view of the screen shown in Fig. 1.

The screen shown in Figs. 1 and 2 comprises a carrier plate 1, provided with a plurality of recesses formed as parallel rectilinear grooves having a triangular cross section, and spaced at equal distances. The surfaces of these grooves are each covered with a layer 2 of a light reflecting and absorbing material. A luminescent crystalline material 3 is deposited in the grooves. The side of the screen at which the luminescent material is deposited in the grooves constitutes the observation surface. It will be understood that light rays generated in the luminescent material by X-rays or cathode rays impinging on the screen and having a direction substantially in parallel with the observation surface, will be reflected by the layers 2 in such a direction that they emanate from the observation surface, so that the total light flux emanating from the observation surface is materially increased and the scattering of the light rays is diminished. Thus, the image formed on the observation surface of the screen is sharper and has a greater luminous intensity than with the usual luminescent screens.

The layer 2 may be deposited on the surfaces of the grooves by means of electrodeposition or by evaporation of a suitable metal in vacuo. If the luminescent screen is to be used for X-ray purposes, it is preferred to use a material with a relatively high atomic number for the layers 2, so that X-rays are absorbed to some extent by these layers. Of course, if the X-rays are generated by a source at the side of the screen remote from the observation surface, they will be absorbed to some extent by the layers 2. However, the absorption of the secondary X-rays will be considerably greater, as their wave length is greater, and as a considerable part of the secondary X-rays have to pass through a plurality of layers 2. Thus, the scattering of the X-rays is also materially diminished.

A suitable material for the carrier plate 1 is an acrylic resin, from which the carrier plate may be molded in its definite shape, i.e. with the recesses, by means of the usual molding procedure.

It will be understood that the grooves in the carrier plate 1 constitute a grid, which is visible in the image produced on the screen if the grid is too coarse. Thus, the grid will have to be so fine that it does not disturb the image. However, if the screen is able to dissolve, for instance, 250 lines per inch, it is not necessary to use a grid consisting of 250 grooves per inch, as a sharp luminous spot on the screen, having a diameter of say 0.004 inch is often surrounded by a luminous spot of less intensity having a diameter of about 0.04 inch.

X-ray screens for transillumination purposes may dissolve, for instance, about 75 lines per inch. By providing the screen with 25 grooves per inch, as indicated in Figs. 1 and 2, the dissolution of the screen will remain about the same, but the contrast will be greatly improved.

In general, the required mesh of the grid will be dependent on the thickness of the screen, and satisfactory results are often obtained by making the distance between adjacent recesses in the carrier plate about equal to the thickness of the screen.

No general rule can be given for the required thickness of the layers 2. If the layer is made of a material of which the atomic number is only slightly higher than that of the luminescent material, the scattering of the X-rays will be greatly diminished even if the thickness of the layers 2 is only a few microns. Preferably, a material with a high atomic number will be used, so that the layers 2 may be very thin and invisible on the screen. The absorption of the layers 2 may be improved by making use of the property of characteristic absorption. By selecting a material for the layers 2, for which the wave length of the characterisic absorption is substantially equal to the expected wave length of the secondary radiation of the luminescent material, the primary X-rays will be absorbed much less than the secondary X-rays.

Figure 3:
Fig. 3 is a cross section of a second embodiment of the invention.

The screen shown in Fig. 3 is provided with grooves having a different cross section. Instead of the triangular grooves shown in Figs. 1 and 2, use is made of rectilinear parallel grooves having a parabolic cross section. This shape of the grooves further improves the reflection of the light rays, so that the conversion efficiency is increased.

Figure 4:
Fig. 4 is a cross section of a modification of the screen shown in Figs. 1 and 2.
Figure 5:
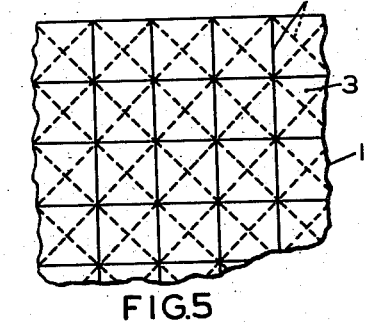
Fig. 5 is a plan view of the screen shown in Fig. 4.

In the embodiment of the invention shown in Figs. 4 and 5, the carrier plate 1 is provided with a great number of recesses, equally distributed on the surface of the screen, and each having the shape of an inverted pyramid. Each of these pyramids is covered on the inside with an absorbent light reflecting layer 2, and filled up with the luminescent matter 3. Thus, the luminescent screen will have a crossed grid structure. All information given hereinbefore with respect to the groove-shaped recesses also applies to the pyramids of the screen according to Figs. 4 and 5.

Figure 6:
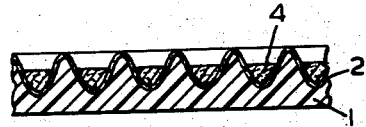
Fig. 6 is a cross section of a modification of the screen shown in Fig. 3.
Figure 7:
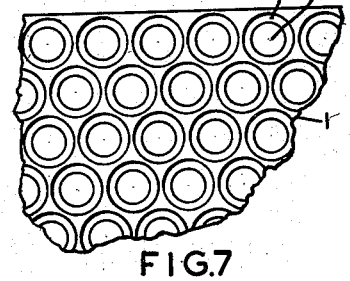
Fig. 7 is a plan view of the screen shown in Fig. 6.

The screen shown in Fig. 3 may be modified in a similar manner to form a screen provided with a great many recesses each having the shape of an inverted paraboloid. Such a modified screen is shown in Figs. 6 and 7. Each of the recesses is again covered on the inside with an absorbent layer 2.

In contradistinction to the screens shown in Figs. 1–5, the recesses of the screen shown in Figs. 6 and 7 are only partially filled with the luminescent material 4. The parts of the recesses that are not filled up with the luminescent material will now have an additional directive effect on the light rays emanating from the observation surface, so that all light rays emanating from the luminescent material at angles of less than 45° with respect to the observation surface may be bundled within an angle of about 45° on the optical axis of the recess.

Figure 8:
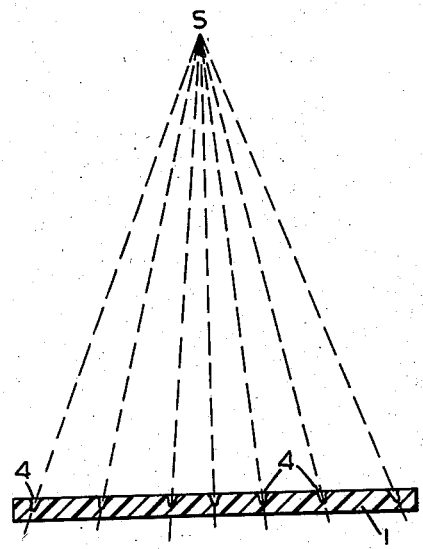
Fig. 8 shows schematically a preferred arrangement of the recesses of a screen of the type shown in Figs. 6 and 7.

If the image appearing on the observation surface of the screen is to be photographed by means of a camera, for instance in X-ray photography, it may be useful to focus the light rays to a point in the plane of the objective of the camera. As schematically shown in Fig. 8, this may be done by arranging the recesses of the carrier plate in such manner that the axes of these recesses are all directed to a common focal point.

Although the invention has been described hereinbefore with reference to some specific embodiments thereof, it will be understood that many modifications are possible within the scope of the invention as set forth in the appended claims. For instance instead of the rectilinear grooves shown in Figs. 1, 2 and 3, curved or oscillating grooves may be used, or grooves arranged in zig zag fashion. Also, the recesses shown in Figs. 4–7 may be modified to have a spherical or conical shape.

I claim:

1. In an apparatus for viewing a picture generated by X-rays in combination a carrier pervious to X-rays and having a plurality of immediately adjacent and evenly spaced depressions on one surface corresponding to a viewing surface, a metallic coating uniformly deposited over the entire surface having said depressions, a luminescent material deposited in said depressions over said metallic coating and having the characteristic of being able to generate light and secondary X-ray radiation when subjected to X-ray radiation, said metallic coating having the characteristic of being able to reflect selected wavelengths of X-ray energy converted to light and absorbing selected wave lengths of X-ray energy and secondary X-ray radiation generated by said luminescent material, said depressions having a depth as not to be visible on said apparatus when operative and having a selected cross-sectional geometry and being disposed relative to one another in a selected pattern so as to reduce scattering of said light rays, whereby sharp images are obtained on said apparatus when operative.

2. An apparatus in accordance with claim 1, in which said spaced depressions are continuous grooves extending at least along a major portion of said carrier and are parallel.

3. An apparatus in accordance with claim 1, in which said spaced depressions are disposed as to comprise a grid and are spaced at a distance substantially equal to the thickness of said carrier.

4. An apparatus in accordance with claim 1, in which said spaced depressions comprise substantially sinuous grooves substantially in the same plane.

5. An apparatus in accordance with claim 1, in which said depressions are triangular in cross-section.

6. An apparatus in accordance with claim 1, in which said depressions are parabolic in cross-section.

7. An apparatus in accordance with claim 1, in which said spaced depressions are pyramidal in cross-section.

8. An apparatus in accordance with claim 1, in which said luminescent material is deposited in said depressions so as to completely fill them.

9. An apparatus in accordance with claim 1, in which said depressions have an optical axis are circular and of equal dimension and parabolic in cross-section, said luminescent material being deposited so as to only partially fill said depressions, whereby light rays emanating from said viewing surface at angles less than 45° with respect to said viewing surface emanate substantially within an angle of 45° to said optical axis.

10. An apparatus in accordance with claim 1, in which said carrier is made of acrylic resin.

11. An apparatus in accordance with claim 1, in which said metallic coating comprises a material having an atomic number higher than the atomic number of said luminescent material, the atomic number being high enough so that X-rays having a short wave length are partially absorbed by said material and said secondary X-ray radiation is absorbed.

12. A method of making a viewing screen for pictures generated by X-rays comprising providing a carrier pervious to X-rays with a plurality of immediately adjacent evenly spaced depressions on one surface, depositing a metallic coating uniformly over the entire surface having said depressions, the metallic coating having the characteristic of being able to reflect selected wave lengths of X-ray energy converted to light and absorbing short wave lengths of X-ray energy, and depositing in said depressions a luminescent material generating light when subjected to said electromagnetic energy, said depressions being of such a depth as not to be visible on said screen when operative and being disposed in a selected pattern for reducing scattering of said light rays, and to permit obtaining sharp images on said screen.

13. A screen for viewing a picture generated by X-ray radiation comprising, a source of X-rays, a carrier pervious to X-rays and having a plurality of immediately adjacent and evenly spaced depressions on one surface, the screen and the depressions each having an optical axis, said depressions being so disposed and having a cross-section geometry so as to have their optical axes directed to a common focal point on the optical axis of the screen, a metallic coating uniformly deposited over the entire surface having said depressions and having the characteristic of being able to reflect selected wave lengths of X-ray energy converted to light and absorbing selected wave lengths of X-ray energy, a luminescent material consisting of radio-sensitive substances substantially free of radio-active substances deposited in said depressions and having the characteristic of being able to generate light when subjected to said X-rays, said depressions being of such a depth as not to be visible on said apparatus when operative and being disposed relatively to one another in a selected pattern so as to reduce scattering of said light rays and permit obtaining sharp images on said apparatus.

References Cited in the file of this patent

UNITED STATES PATENTS

| | | |
|---|---|---|
| 1,467,132 | Bilstein | Sept. 4, 1923 |
| 2,198,327 | Bandringa | Apr. 30, 1940 |
| 2,527,981 | Bramby | Oct. 31, 1950 |
| 2,546,160 | Lengyel | Mar. 27, 1951 |
| 2,579,772 | Wilder | Dec. 25, 1951 |
| 2,642,365 | Gier et al. | June 16, 1953 |

FOREIGN PATENTS

| | | |
|---|---|---|
| 449,244 | Great Britain | June 26, 1936 |